United States Patent
Oteri et al.

(10) Patent No.: US 12,302,338 B2
(45) Date of Patent: May 13, 2025

(54) SYSTEMS AND METHODS FOR PUCCH RESOURCE IDENTIFICATION IN MULTI-PxSCH TRANSMISSION

(71) Applicant: Apple Inc., Cupertino, CA (US)

(72) Inventors: Oghenekome Oteri, San Diego, CA (US); Chunhai Yao, Beijing (CN); Chunxuan Ye, San Diego, CA (US); Dawei Zhang, Saratoga, CA (US); Haitong Sun, Irvine, CA (US); Hong He, Cupertino, CA (US); Huaning Niu, San Jose, CA (US); Seyed Ali Akbar Fakoorian, San Diego, CA (US); Sigen Ye, Whitehouse Station, NJ (US); Wei Zeng, San Diego, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 565 days.

(21) Appl. No.: 17/438,926

(22) PCT Filed: Jan. 14, 2021

(86) PCT No.: PCT/CN2021/071695
§ 371 (c)(1),
(2) Date: Sep. 13, 2021

(87) PCT Pub. No.: WO2022/151136
PCT Pub. Date: Jul. 21, 2022

(65) Prior Publication Data
US 2022/0400508 A1 Dec. 15, 2022

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1812* (2013.01); *H04L 1/1854* (2013.01); *H04L 1/1864* (2013.01); *H04L 1/1887* (2013.01)

(58) Field of Classification Search
CPC ..... H04W 72/23; H04L 1/1854; H04L 1/1887
See application file for complete search history.

(56) References Cited

U.S. PATENT DOCUMENTS

2019/0306923 A1* 10/2019 Xiong ................. H04J 13/0062
2020/0100286 A1* 3/2020 Xu .......................... H04L 1/187
(Continued)

FOREIGN PATENT DOCUMENTS

| CN | 110830172 A | 2/2020 |
| CN | 111435901 A | 7/2020 |

(Continued)

OTHER PUBLICATIONS

International Search Report for PCT Patent Application No. PCT/CN2021/071695; mailed Oct. 20, 2021.
(Continued)

*Primary Examiner* — Jackie Zuniga Abad
(74) *Attorney, Agent, or Firm* — Kowert, Hood, Munyon, Rankin & Goetzel, P.C.

(57) ABSTRACT

This disclosure relates to techniques for performing wireless communications, including signaling resource allocation for multiple transport blocks (TBs) on either PUSCH or PDSCH using a single control element, such as a DCI. In particular, the single control element may signal resources scheduled for transmission of acknowledgment feedback information for all of the PDSCH TBs. Various approaches are disclosed, with varying levels of signaling overhead.

13 Claims, 7 Drawing Sheets

(51) Int. Cl.
*H04L 1/1829* (2023.01)
*H04L 1/1867* (2023.01)

(56) References Cited

U.S. PATENT DOCUMENTS

| | | |
|---|---|---|
| 2020/0313803 A1 | 10/2020 | Khoshnevisan |
| 2022/0166591 A1* | 5/2022 | Aiba .................... H04L 1/1864 |
| 2022/0191839 A1* | 6/2022 | Ying .................... H04L 1/1812 |

FOREIGN PATENT DOCUMENTS

| | | |
|---|---|---|
| EP | 3681072 | 7/2020 |
| WO | 2019210875 A1 | 11/2019 |

OTHER PUBLICATIONS

Huawei "Feature lead summary of HARQ enhancements for NR-U"; 3GPP TSG RAN WG1 Meeting #97 R1-1907652; May 17, 2019.
Motorola Mobility et al. "Discussion on out-of-order scheduling and HARQ"; 3GPP TSG RAN WG1 Meeting #98bis R1-1911038; Oct. 20, 2019.
Extended European Search Report for EP Patent Application No. 21918346.4; Sep. 26, 2024.

* cited by examiner

Common fields

| Identifier for DCI formats |
| Carrier indicator |
| Bandwidth part indicator |
| Modulation and coding scheme |
| TPC command for scheduled PUSCH |
| Precoding information and number layers |
| Antenna ports |
| PTRS-DMRS association |
| beta_offset_indicator |
| DMRS sequence initialization |
| HARQ process number |
| Time-Domain RA |

Slot-specific fields

| SRS resource indicator |
| SRS request |
| CSI request |
| 1st downlink assignment index |
| 2nd downlink assignment index |

HARQ process ID signaled in the DCI may apply to the first scheduled PUSCH. HARQ process may then be incremented by 1 for subsequent PUSCHs in the scheduled order (with modulo operation as needed).

At least support continuous time domain resource assignment with Type A and Type B PUSCHs.

FIG. 6

SYSTEMS AND METHODS FOR PUCCH RESOURCE IDENTIFICATION IN MULTI-PxSCH TRANSMISSION

PRIORITY CLAIM INFORMATION

This application is a national stage application of International Application No. PCT/CN2021/071695, filed on Jan. 14, 2021, titled "Systems and Methods for PUCCH Resource Identification in Multi-PxSCH Transmission", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to improved signaling for multiple communications.

Description of the Related Art

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be improving efficiency in signaling multiple transmissions. Improvements in the field are desired.

SUMMARY

Embodiments are presented herein of, inter alia, systems, apparatuses, and methods for transmitting a plurality of PUSCH or PDSCH transmissions using a single control element, such as a downlink control message (DCI), and signaling associated feedback.

As noted above, the number of use cases for wireless networks communicating with different classes of user equipment devices (UEs) with widely variable capabilities and usage expectations are growing. One direction in expansion of possible use cases supported by wireless communication techniques may include increasing use of techniques for scheduling multiple communications, e.g., multiple transport blocks on physical uplink share channel (PUSCH) and/or physical downlink share channel (PDSCH) (e.g., multi-PxSCH). A base station scheduling a multi-PxSCH transmission may employ various processes to signal to a UE the resource allocations for the multiple TBs, while avoiding excessive signaling overhead. In particular, the signaling may also include signaling of resource allocations for uplink signals to provide feedback regarding reception of each of the PDSCH transmissions. Such processes are described herein, along with various systems and apparatuses for implementing such processes.

As one example, a method is disclosed for signaling feedback scheduling in a wireless communication network. A base station of the wireless communication network may generate a downlink control message including respective downlink grants for a plurality of payload data messages, and parameters indicating uplink resources for transmission of acknowledgment feedback for each of the payload data messages. The base station may transmit the downlink control message to a user equipment (UE), and may also transmit the plurality of payload data messages according to the downlink grants. The base station may then receive, from the UE, acknowledgment feedback for each of the payload data messages, via the indicated uplink resources.

In some scenarios, the plurality of payload data messages may be transmitted on a physical downlink shared channel (PDSCH).

In some scenarios, the indicated uplink resources may specify a single uplink message for transmission of the acknowledgment feedback for each of the payload data messages, In some scenarios, the indicated uplink resources may be selected based on the size of the acknowledgment feedback for all of the payload data messages of the plurality of payload data messages.

In some scenarios, the indicated uplink resources may specify a plurality of uplink messages for transmission of the acknowledgment feedback for respective payload data messages of the plurality of payload data messages.

In some scenarios, a first of the uplink messages may include acknowledgement feedback for a first set of the payload data messages, and a second of the uplink messages may include acknowledgment feedback for a second set of the payload data messages, wherein the downlink control message identifies the first set of the payload data messages as high-priority messages and the second set of the payload data messages as low-priority messages.

In some scenarios, the downlink control message may specify a first modulation and coding scheme (MCS) for the first of the uplink messages, and a second MCS for the second of the uplink messages.

In some scenarios, the indicated uplink resources may specify a respective uplink message for transmission of the acknowledgment feedback for each of the payload data messages.

In some scenarios, the downlink control message may include an indication of a number of slots, indicating that, for each of the payload data messages of the plurality of payload data messages, the uplink resources for transmission of acknowledgment feedback for the respective payload data message are located in the slot that follows transmission of the respective payload data message by the indicated number of slots.

In some scenarios, the downlink control message may include a respective indication of a number of slots for each of the payload data messages of the plurality of payload data messages, wherein the uplink resources for transmission of acknowledgment feedback for a payload data message are located in the slot that follows transmission of the payload data message by the respective indicated number of slots.

In some scenarios, the downlink control message may include an index identifying an entry in a predefined table, the entry identifying a plurality of timing indicators, wherein each of the timing indicators corresponds to a respective payload data message of the plurality of payload data messages, wherein each of the timing indicators indicates a time difference between the slot in which the corresponding payload data message is scheduled to be transmitted and a slot in which the corresponding acknowledgment feedback is scheduled to be transmitted.

As another example, a method is disclosed for signaling feedback scheduling in a wireless communication network. A user equipment (UE) of the wireless communication network may receive, from a base station of the wireless communication network, a downlink control message including respective downlink grants for a plurality of payload data messages. The LE may also receive, from the base station, at least a subset of the plurality of payload data messages. The UE may determine uplink resources for use in transmitting feedback information for each of the payload data messages, wherein the determining is based on parameters included in the downlink control message. The UE may then transmit the feedback information for each of the payload data messages, via the determined uplink resources.

In some scenarios, the parameters included in the downlink control message may specify a single uplink message for transmission of the feedback information for each of the payload data messages.

In some scenarios, the parameters included in the downlink control message may specify a plurality of uplink messages for transmission of the feedback information for respective payload data messages of the plurality of payload data messages.

In some scenarios, a first of the uplink messages may include feedback information for a first set of the payload data messages, and a second of the uplink messages may include feedback information for a second set of the payload data messages, wherein the downlink control message identifies the first set of the payload data messages as high-priority messages and the second set of the payload data messages as low-priority messages.

In some scenarios, the downlink control message may specify a first modulation and coding scheme (MCS) for the first of the uplink messages, and a second MCS for the second of the uplink messages.

In some scenarios, the parameters included in the downlink control message may specify a respective uplink message for transmission of the feedback information for each of the payload data messages.

In some scenarios, the downlink control message may include an index identifying an entry in a predefined table, the entry identifying a plurality of timing indicators, wherein each of the timing indicators corresponds to a respective payload data message of the plurality of payload data messages, wherein each of the timing indicators indicates a time difference between the slot in which the corresponding payload data message is scheduled to be transmitted and a slot in which the corresponding feedback information is scheduled to be transmitted.

Apparatuses and systems are disclosed for implementing any of the above methods, as well as other methods described herein.

The techniques described herein may be implemented in and/or used with a number of different types of devices, including but not limited to mobile telephones or smart phones (e.g., iPhone™. Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 5-7 illustrate aspects of multi-PUSCH scheduling, according to some embodiments.

Figure 1:
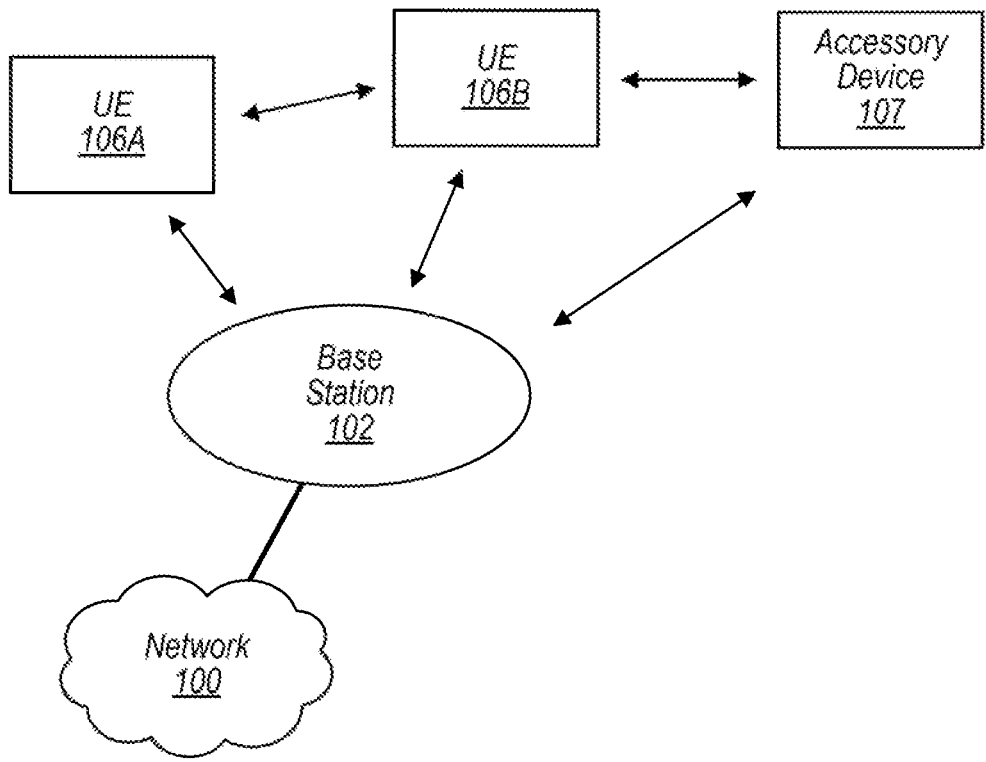
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.
3GPP: Third Generation Partnership Project
3GPP2: Third Generation Partnership Project 2
CBGFI: Codebook Group Flushing Index
CBGTI: Codebook Group Transmission Index
CE: Control Element
DAI: Downlink Assignment Index
DCI: Downlink Control Indicator
DL: Downlink FDRA: Frequency Domain Resource Allocation
GSM: Global System for Mobile Communications
HARQ: Hybrid Automatic Repeat reQuest
LTE: Long Term Evolution
MAC: Media Access Control
MCS: Modulation and Coding Scheme
NDI: New Data Indicator
PDSCH: Physical Downlink Shared Channel
PRI: PUCCH Resource Indicator
PUCCH: Physical Uplink Control Channel
PUSCH: Physical Uplink Shared Channel
PxSCH: Refers to either PDSCH or PUSCH
RRC: Radio Resource Control
RV: Redundancy Version
SCS: Subcarrier Spacing
TDRA: Time Domain Resource Allocation
TTI: Transmission Time Interval
UL: Uplink
UMTS: Universal Mobile Telecommunications System Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
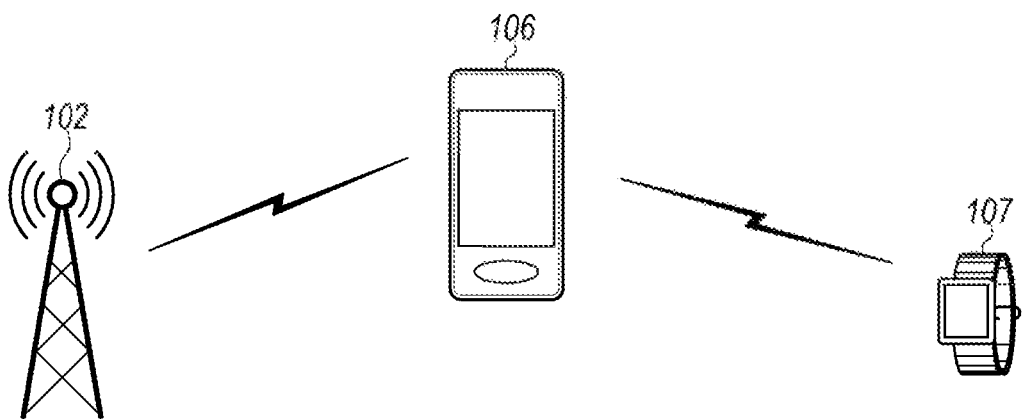
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000. LTE, LTE-A, NR, WLAN, Bluetooth, one or more global navigational satellite wo systems (GNSS, e.g., GPS or GLONASS), one and/or more mobile television broadcasting standards (e.g., ATSC-MIH), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The LE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory 1w device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include 13 separate transmit and/or receive chains (e.g., including separate antennas and other radio components) for each wireless communication protocol with which it is configured to communicate. As a further possibility, the UE 10 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
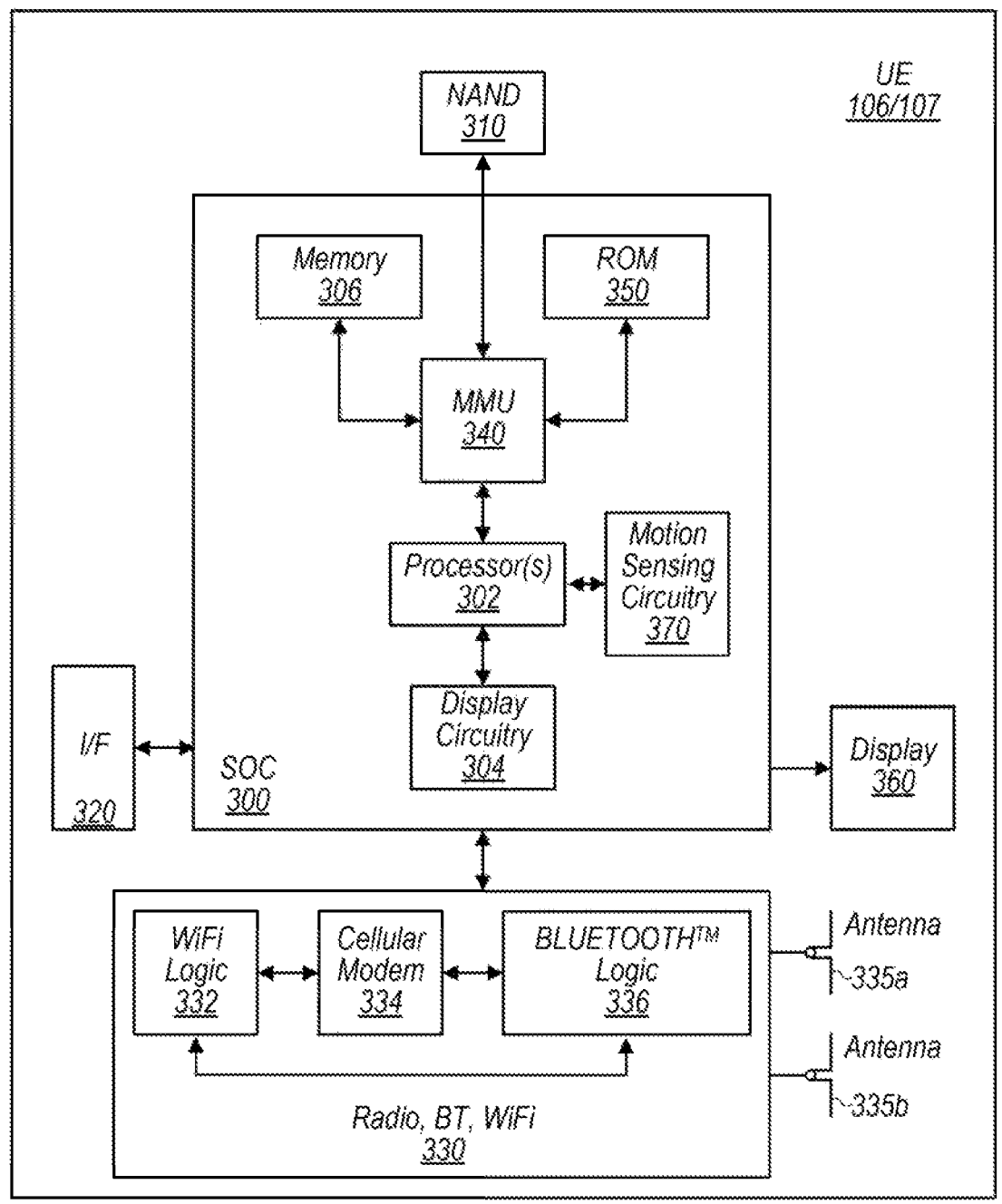
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, 1/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
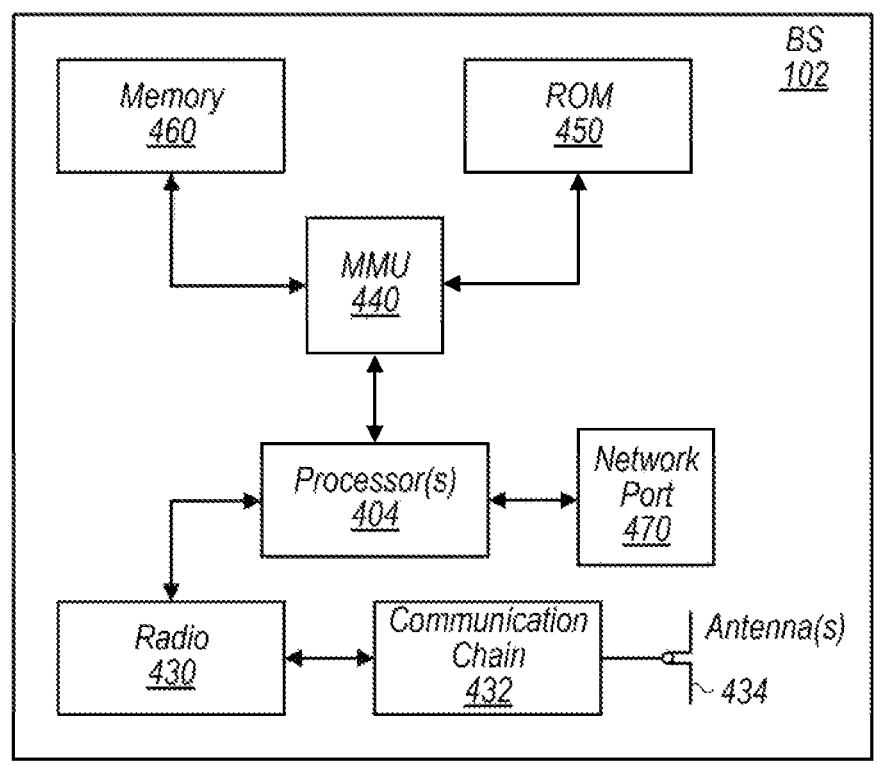
FIG. 4 is a block diagram illustrating an example base station, according to some embodiments.

FIG. 4—Block Diagram of a Base Station

FIG. 4 illustrates an example block diagram of a base station 102, according to some embodiments. 11 is noted that the base station of FIG. 4 is merely one example of a possible base station. As shown, the base station 102 may include processor(s) 404 which may execute program instructions for the base station 102. The processor(s) 404 may also be coupled to 1w memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
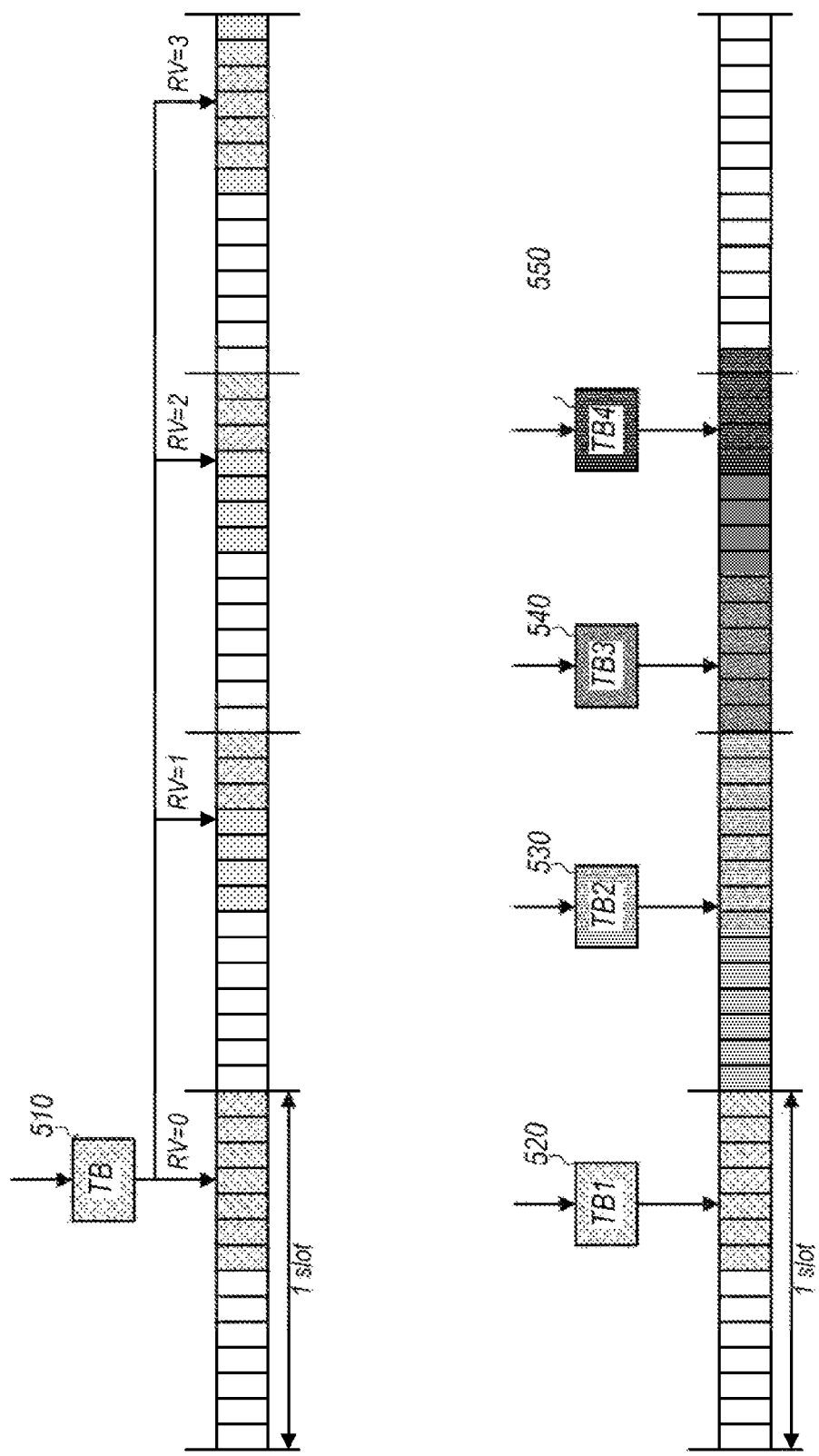
Figure 7:
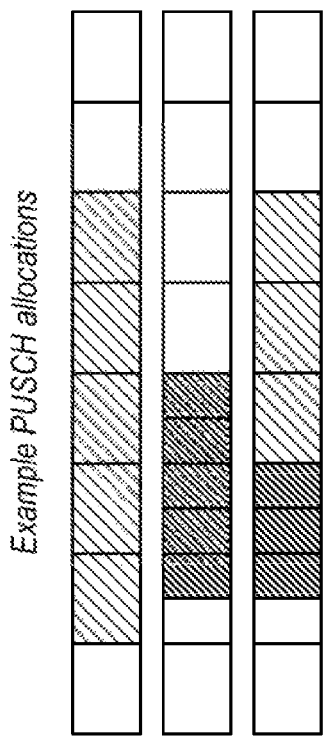

FIGS. 5-7—Scheduling Multiple Communications

Scheduling of multiple communications using a single scheduling message may allow for reduced overhead, e.g., relative to individual scheduling of the communications. Accordingly, wireless communications such as new radio (NR) and NR-unlicensed (NR—U) may support means of scheduling multiple uplink (IL) and/or downlink (DL) communications (e.g., to occur over a period of time) using a single scheduling message. For example, a base station may schedule multiple physical UL shared channel (PUSCH) and/or physical DL shared channel (PDSCH) messages (e.g., multi-PxSCH messages may refer to multiple UL and/or DL communications on the respective shared channels) together.

FIG. 5 illustrates examples of multi-PUSCH scheduling, according to some embodiments. As shown, in a first example, a PUSCH transmission transport block (TB) 510 may be scheduled to repeat in multiple transmission time intervals (e.g., multi-TTI PUSCH transmission). This repetition in time may support reliability (e.g., for ultra reliable low latency communication (URLLC) services) or otherwise ensure UL coverage. As used herein, references to a "PDSCH" or a "PDSCH message" may refer to a TB transmitted on the PDSCH. Similarly, references to a "PUSCH" or a "PUSCH message" may refer to a TB transmitted on the PUSCH.

In a second example, multi-TTI PUSCH transmission may be used to schedule multiple slots and/or mini-slots with different TBs (e.g., 520, 530, 540, and 550) using a single UL grant. The TBs may be scheduled at aperiodic times. This may allow for higher efficiency. For example, when using unlicensed spectrum, scheduling the TBs sequentially may allow for increased UL transmissions probability, e.g., because other users may not contend for the spectrum between transmissions. Presently, 3GPP standards provide for transmission of multiple TBs on the PUSCH based on a single UL grant (e.g., signaled by a single DCI) only within such sequential (i.e., contiguous) transmissions, e.g., in unlicensed frequency ranges.

FIG. 6 illustrates various fields from an example downlink control indicator (DC) that may be used to schedule such a contiguous multi-PUSCH transmission. In some scenarios, the illustrated fields may be included in an information element or other message for time domain resource allocation (TDRA), such as: pusch-TimeDomainAllocation-ListForMultiPUSCH, and/or PUSCITimeDomainResourceAllocationList-r16, among various possibilities. Such fields may be used to configure a TDRA table for multi-PUSCH scheduling.

FIG. 7 illustrates an example portion of a TDRA table that may be used for scheduling such a contiguous multi-PUSCH transmission, according to some embodiments. As shown, a plurality of TDRA index values may be configured with various parameters. The parameters may include K2 (e.g., a delay between the DCI and the slot at which the applicable PDSCH will be transmitted, e.g., measured in slots), S (e.g., the symbol at which a particular communication starts), L (e.g., the length of each communication, e.g., in symbols), and mapping type. S and L may be referred to as start and length indicator value (SLIV). Additional or different fields may be included as desired. Further the time units may be different, etc.

In some embodiments, multi-TTI PUSCH scheduling may use DCI format 0_1. The TDRA table configuration may allow indicating single or multiple continuous PxSCHs in any slot of the multiple scheduled slots.

In some embodiments, a maximum number of PxSCH in a row may be set. For example, such a maximum may be 8, among various possibilities.

In some embodiments, a number of new data indicator (NDI) bits and/or redundancy version (RV) bits in DCI format 0_1 may be determined based on the configured TDRA table. For example, one RV bit per PxSCH may be used in case multiple PxSCHs are scheduled. The RV may be one value of {0,2}. Two RV bits for the PxSCH may be used in case only a single PxSCH is scheduled.

In some embodiments, the TDRA table may be extended such that each row indicates multiple PxSCHs (e.g., continuous in time-domain). Each PxSCH may have a separate SLIV and mapping type. The number of scheduled PxSCHs may be signaled by the number of indicated valid SLIVs in the row of the TDRA table signaled in DCI.

Dynamic PxSCH Scheduling Parameters

In some scenarios, further improvements are desired to allow more efficient scheduling of multiple communications using a single control element, such as a single DCI. For example, at high frequencies (e.g., above 52.6 GHz), the phase noise increases, which may encourage system designers to compensate by increasing the size of subcarrier spacing. This, in turn, reduces the symbol duration, resulting in a higher number of shorter symbols, relative to communicating the same quantity of data at lower frequencies. This may result in higher scheduling overhead, as larger numbers of signals need to be scheduled. It may be noted that scheduling each PUSCH and PDSCH via a separate DCI would waste resources, at least because many of the parameters signaled would be redundant across the respective DCIs. It may therefore be advantageous to schedule multiple PUSCHs and/or multiple PDSCHs (i.e., multiple PxSCHs) via a single DCI, e.g., to reduce scheduling overhead.

Additionally, it may be advantageous to allow for signaling the scheduling of the multiple PxSCHs in either a contiguous or non-contiguous manner. For example, spacing out the scheduled transmissions may allow for pre-scheduling of expected DL data (e.g., across multiple slots) that has not yet arrived in a DL buffer. As another example, a transmitter may be scheduled to transmit multiple beams to a single receiver within a scheduling unit, e.g., where the scheduling unit may include multiple slots, rather than a single slot, to compensate for the reduction in symbol duration with increasing SCS. Non-contiguous scheduling of PxSCHs may allow for a gap between the transmissions, to accommodate the downtime experienced during beam switching. As yet another example, a transmitter may be scheduled to transmit to multiple receivers that have various timing requirements that necessitate interleaved scheduling of the receivers to satisfy the timing requirements. Thus, the transmissions scheduled for a given receiver may be non-contiguous.

In order to schedule a multiple PxSCH transmission between a base station (such as the base station 102) and a UE (such as the UE 106), both entities should be aware of the parameters for the transmission. Because the base station typically schedules the transmissions, this may include the base station notifying the UE of the resource allocations and/or other applicable parameters.

Scheduling multiple PDCCH transmissions may introduce additional complexities regarding HARQ feedback, such as how to indicate scheduling of PUCCH resources to be used for HARQ feedback associated with the multiple PDCCHs.

Traditionally, a PDSCH may provide HARQ-ACK feedback via a PUCCH. The HARQ-ACK feedback may indicate whether the associated PDSCH was successfully received. The DCI carrying the DL grant for the PDSCH may include a timing indicator (referred to herein as K1) indicating the number of slots from the transmission of the PDSCH to the associated HARQ-ACK feedback slot of the PUCCH. Additionally, a PUCCH resource within that slot may be identified for transmission of the feedback. In some scenarios, a collection (e.g., 1, 8, or some other number) of available PUCCH resource sets may be designated, e.g., via RRC signaling. An appropriate resource set may be selected from that collection, based on the size of the feedback, among other possible factors. For example, a resource set may be selected because it contains one or more available resources that may efficiently fit the feedback to be transmitted. To select a particular resource from within the selected resource set, the DC may include a PUCCH Resource Identification (PRI), which may include an index to identify a resource of the resource set. In some scenarios, the PRI may be included in the DCI in response to the DCI including DL grants for multiple PDSCH transmissions. The identified resource may designate parameters for transmitting the feedback, such as a starting resource block, a frequency hopping indication, and format information, such as the number of symbols and a starting symbol format, which may imply size of the feedback in both the time domain and the frequency domain.

Thus, signaling multiple PDCCH transmissions via DL grants in a single DCI may involve modifying the DCI, or other signaling, to communicate feedback information, such as K1 and the PRI, for each signaled PDCCH transmission. However, the DC should preferably be modified in a way that will reduce undue overhead signaling. Several possible approaches are disclosed below.

Figure 8:
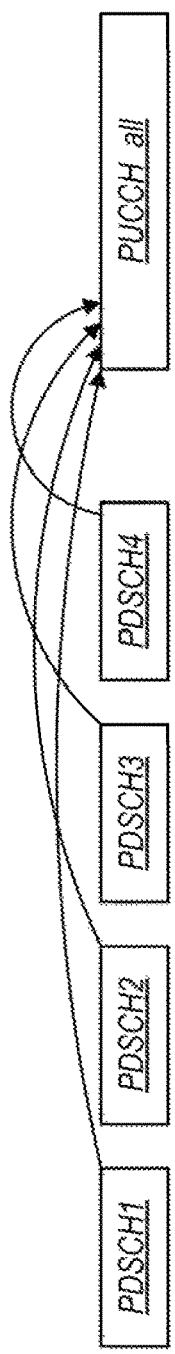
FIGS. 8-11 illustrate various examples of resource assignment relationships between PDSCH transmissions and PUCCH transmissions, according to some embodiments.

FIG. 8—Single PUCCH Feedback Per Multi-PDSCH Transmission

In a first approach, for a multi-PDSCH transmission including some number "N" PDSCH transmissions, a single PUCCH feedback resource may be scheduled for all N of the PDSCH transmissions. This may simplify signaling, and reduce overhead, by allowing a DCI to include a single K1 value and a single PRI value for the entire multi-PDSCH transmission.

For example, the K1 value indicated by the DC may indicate a PUCCH slot scheduled for transmission of feedback associated with all PDSCH transmissions signaled by the DCI. This K1 value may indicate the number of slots from the last PDSCH transmission of the multi-PDSCH transmission to the indicated PUCCH slot. Alternatively, K1 may indicate the number of slots to the indicated PUCCH slot, relative to the first PDSCH transmission of the multi-PDSCH transmission, or some other reference point. This K1 value should satisfy processing limits for the last PDSCH transmission. In some scenarios, a processing limit may be a function of the number (N) of PDSCH transmissions. E.g., the processing time needed may increase with each additional PDSCH included in the multi-PDSCH transmission.

In this approach, a single PUCCH resource set may also be selected, e.g., based on feedback size of the entire pool of feedback for all PDSCH transmissions in the multi-PDSCH transmission.

In this approach, the DCI may include a single PRI, which may indicate a PUCCH resource from among the selected PUCCH resource set. The feedback for all PDSCH transmissions in the multi-PDSCH transmission may be transmitted on the single indicated PUCCH resource.

FIG. 8 illustrates an example of this approach. As illustrated, a multi-PDSCH transmission may include four PDSCH transmissions: PDSCH1, PDSCH2, PDSCH3, and PDSCH4. A single DCI may include DL grants for each of these PDSCH transmissions. The DCI may also include a K1 value (e.g., 2), which indicates that HARQ-ACK feedback for all PDSCH transmissions in the multi-PDSCH transmission is scheduled to be transmitted in the slot that is K1 slots (e.g., 2 slots) after PDSCH4. Additionally, a single PUCCH resource set may be identified, based on the size of the combined feedback. The DCI may include a PRI value, which identifies a PUCCH resource from within the PUCCH resource set, wherein the identified PUCCH resource should be of sufficient size to accommodate the feedback for the multi-PSDCH transmission. The identified PUCCH resource may then be used to transmit the feedback for the multi-PDSCH transmission. This is illustrated as PUCCH all.

In this approach, each PDSCH may be assumed to be associated with a downlink assignment index (DAI), which may include a counter DAI (cDAI) for HARQ codebook type 2.

However, the cDAI may not be included in the DCI for each PDSCH. Instead, the DCI may include a single cDAI, which may be incremented by N, relative to a preceding DCI (e.g., a DCI of a preceding multi-PDSCH transmission). For example, in the scenario of FIG. 8, the DCI may include the cDAI of the final PDSCH (PDSCH4). In this example, the cDAI indicated in the present multi-PDSCH transmission may be referred to as cDA10. The preceding DL DCI may have included a cDAI equal to cDA10-N. The cDAI may therefore serve as an indication in HARQ-ACK procedures of how many PDSCH transmissions should be received in the multi-PDSCH transmission. Alternatively, cDA10 may be the cDAI associated with the first PDSCH of the multi-PDSCH transmission (PDSCH1), and a subsequent DL DCI may include a cDAI equal to cDAI0+N.

The preceding discussion of cDAI assumes a single-carrier scenario. In a multicarrier scenario, the DCI may include a separate cDAI indicating the number of PDSCH transmissions included in each carrier, and the DAI of the DCI may also include a total DAI (tDAI) field, which indicates a total number PDSCH transmissions across all carriers. In some scenarios, the DAI of the DCI may also include the tDAI in single-carrier scenarios, e.g., in any other implementations allowing multiple transmissions within a single slot.

Figure 9:
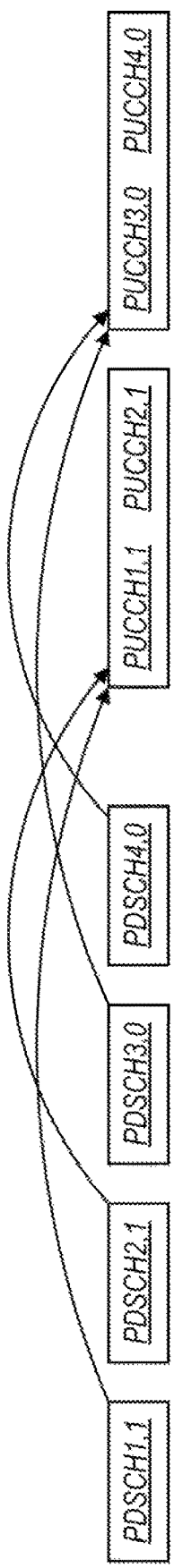
Figure 10:
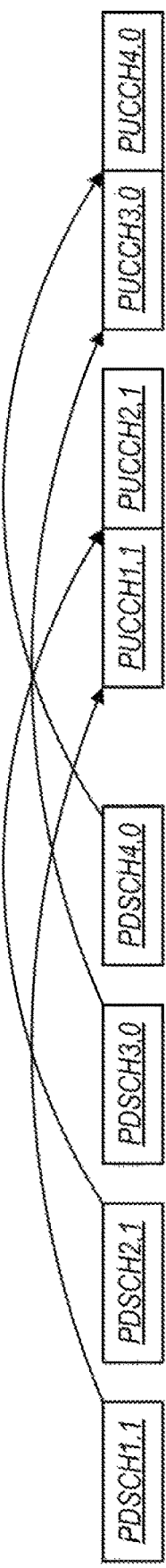

FIGS. 9-10—Single PUCCH Feedback Per Multi-PDSCH with HARQ Priorities

In a second approach, for a multi-PDSCH transmission including N PDSCH transmissions, the DCI may again include a single K1 value and a single PRI value for the entire multi-PDSCH transmission. However, in this approach, the DCI may also include HARQ priority information, which may indicate whether one or more PDSCH is high-priority or low-priority. Alternatively, the HARQ priority information may indicate additional levels or degrees of priority.

As a first option, the DCI may include a single HARQ priority indication that may apply to all PDSCH transmissions of the multi-PDSCH transmission. In some scenarios, selection of the PUCCH resource set may be based at least partly on the priority indication of the PDSCH transmission(s), e.g., in addition to feedback size.

As a second option, the DCI may indicate a respective HARQ priority value for each PDSCH transmission of the multi-PDSCH transmission. For example, the DCI may include a bitmap, including a bit for each of the N PDSCH transmissions. Because the selection of the PUCCH resource set may be based at least partly on the priority indication of the respective PDSCH transmission, this option may result in transmission of HARQ-ACK feedback in two or more PUCCH resources. FIG. 9 illustrates an example of this.

As illustrated in FIG. 9, the DCI may include an indication that PDSCH1 and PDSCH2 are high-priority (e.g., illustrated as priority value "1"). The DCI may also include an indication that PDSCH3 and PDSCH4 are low-priority (e.g., illustrated as priority value "0"). In this example, the DC includes only a single K1 value (e.g., 2), such that all four PDSCH transmissions may be scheduled to transmit HARQ-ACK feedback during the same slot; K1 slots (e.g., 2 slots) after PDSCH4. The DCI also includes only a single PRI value (e.g., PR110). However, the status of PDSCH1 and PDSCH2 as high-priority PDSCH transmissions may cause selection of a first PUCCH resource set (e.g., resource set 3) for their respective feedback, while the status of PDSCH3 and PDSCH4 as low-priority PDSCH transmissions may cause selection of a second PUCCH resource set (e.g., resource set 2) for their respective feedback, Therefore, as illustrated in FIG. 9, HARQ-ACK feedback for PDSCH1 and PDSCH2 may be transmitted in a first PUCCH resource (e.g., PR110 of resource set 3), while HARQ-ACK feedback for PDSCH3 and PDSCH4 may be transmitted in a second PUCCH resource (e.g., PR110 of resource set 2).

If the same PUCCH resource set is selected for high-priority PDSCH transmissions and low-priority transmissions, the feedback for the high-priority PDSCH transmissions may still be scheduled in a different PUCCH resource than the feedback for the low-priority PDSCH transmissions. For example, this scenario would nominally cause a scheduling conflict between the two feedback transmissions, as both would be scheduled in the same slot, with the same PUCCH resource set selection, and the same PRI value. However, in such a scenario, the PRI value may be incremented for one of the feedback transmissions. For example, if the DC indicates a PRI value of PR110, then one of the feedback transmissions (e.g., the feedback for the high-priority PDSCH transmissions PDSCH1 and PDSCH2) may be scheduled according to PR110, while the other feedback transmission (e.g., the feedback for the low-priority PDSCH transmissions PDSCH3 and PDSCH4) may be scheduled according to PR111 (or another PRI value).

In some scenarios, a particular higher layer parameter (e.g., priorityIndicatorForDCI-Format1-x) may be configured as a flag that the UE may not be expected to receive a multi-PDSCH scheduling DCI with different values of the priority indicator field. This may be useful in that PDSCH transmissions with different priority may have different block error ratio (BLER) requirements, which may make sharing an MCS field difficult.

In some scenarios, the DCI may include two MCS fields (e.g., in DCI Format 1_x). For example, the first MCS field may be used for PDSCH transmissions having a first priority, and the second MCS field may be used for PDSCH transmissions having a second priority. If only a single priority is used, then the second field may be reserved, or set to '0' or any other appropriate placeholder value. The DCI may include additional MCS fields in scenarios in which more than two (e.g., high and low) priority values are used.

Similarly, in some scenarios, the DCI may include two PRI fields. For example, the first PRI field may be used for PDSCH transmissions having a first priority, and the second PRI field may be used for PDSCH transmissions having a second priority. This may be beneficial in that the two PRI values may point to different PUCCH resources having different uplink control information (UCI) detection performance. The DCI may include additional PRI fields in scenarios in which more than two priority values are used.

Similarly, in some scenarios, the DCI may include two K1 values. For example, the first K1 value may be used for PDSCH transmissions having a first priority, and the second K1 value may be used for PDSCH transmissions having a second priority. In some scenarios, a K1 value for use with PDSCH transmissions having a high priority may have a smaller value than a K1 value for use with PDSCH transmissions having a low priority, e.g., such that HARQ-ACK feedback for high-priority PDSCH transmissions may be scheduled earlier. The DCI may include additional K1 fields in scenarios in which more than two priority values are used.

In some scenarios, an information element (IE) may be added to indicate priority for each scheduled PDSCH transmission.

In some scenarios, the HARQ-ACK feedback may be further divided between multiple PUCCH resources, e.g., due to size constraints. For example, if the feedback to be transmitted for the multi-PDSCH transmission, or for one priority group of the multi-PDSCH transmission, is too large to fit within an available PUCCH resource, then the feedback may be divided between multiple PUCCH resources. FIG. 10 illustrates an example of this.

As illustrated in FIG. 10, the DCI may include an indication that PDSCH1 and PDSCH2 are high-priority (e.g., illustrated as priority value "I"). The DCI may also include an indication that PDSCH3 and PDSCH4 are low-priority (e.g., illustrated as priority value "0"). In this example, the DCI includes only a single K1 value (e.g., 2), such that all four PDSCH transmissions may be scheduled to transmit HARQ-ACK feedback during the same slot; K1 slots (e.g., 2 slots) after PDSCH4. The DCI also includes only a single PRI value (e.g., PR110). However, as in FIG. 9, the status of PDSCH1 and PDSCH2 as high-priority PDSCH transmissions may cause selection of a first PUCCH resource set (e.g., resource set 3) for their respective feedback, while the status of PDSCH3 and PDSCH4 as low-priority PDSCH transmissions may cause selection of a second PUCCH resource set (e.g., resource set 2) for their respective feedback.

However, in the example of FIG. 10, the first PUCCH resource (e.g., PR110 of resource set 3) may not be large enough to transmit the HARQ-ACK feedback for PDSCH1 and PDSCH2. Similarly, the second PUCCH resource (e.g., PR110 of resource set 2) may not be large enough to transmit the HARQ-ACK feedback for PDSCH3 and PDSCH4. Therefore, the HARQ-ACK feedback for PDSCH1 and PDSCH2 may be divided between two PUCCH resources.

For example, the PRI value may be incremented for one of the HARQ-ACK feedback transmissions, to avoid a conflict. E.g., the feedback for PDSCH1 may be scheduled for transmission according to PR110 of resource set 3, while the feedback for PDSCH2 may be scheduled for transmission according to PR111 of resource set 3. As an example of an alternative solution, feedback for PDSCH3 and PDSCH4 may be scheduled according to different PUCCH resource sets. For example, feedback for PDSCH3 may be scheduled according to PR110 of resource set 2, while feedback for PDSCH4 may be scheduled according to PR110 of resource set 1.

As an alternative, if the feedback to be transmitted for the multi-PDSCH transmission, or for one priority group of the multi-PDSCH transmission, is too large to fit within an available PUCCH resource, then the feedback for one or more low-priority PDSCH transmissions may be dropped (e.g., not transmitted), and the feedback for the remaining PDSCH transmissions may be transmitted as indicated.

In this second approach, the DCI may include two distinct DAI counts (e.g., per component carrier), e.g., one for high-priority PDSCH transmissions and one for low-priority PDSCH transmissions. Instead of the DCI including one cDAI, which is incremented by the number of all PDSCH transmissions in the carrier within the multi-PDSCH transmission, the DCI may include a high-priority cDAI, which is incremented by the number of high-priority PDSCH transmissions in the carrier, and a low-priority cDAI, which is incremented by the number of low-priority PDSCH transmissions in the carrier. The high-priority cDAI may be associated with the high-priority PUCCH resource(s), and the low-priority cDAI may be associated with the low-priority PUCCH resource(s).

Alternatively, the DCI may include only a single DAI count (e.g., per component carrier), and the priority indications for each PDSCH transmission may be used to determine which cDAI values should be associated with the high-priority PUCCH resource(s), and which cDAI values should be associated with the low-priority PUCCH resource(s).

Figure 11:
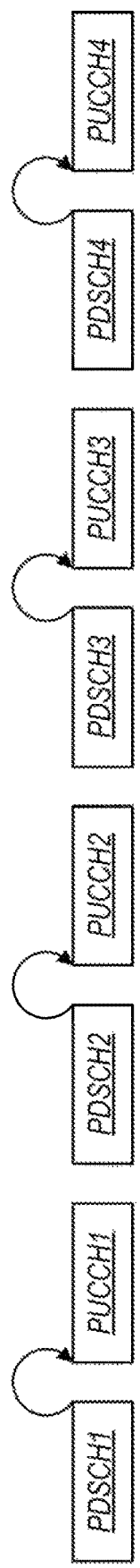

FIG. 11—Single PUCCH Feedback Per PDSCH Transmission

In a third approach, for a multi-PDSCH transmission including N PDSCH transmissions, separate PUCCH feedback may be scheduled for each PDSCH transmission, e.g., as illustrated in FIG. 11. As illustrated, the feedback for each PDSCH transmission may be scheduled for transmission in a separate PUCCH resource.

In some scenarios, the DCI may include a single K1 value for use by all N PDSCH transmissions. In such scenarios, the indicated K1 value may be treated as relative to each PDSCH. For example, if the K1 value is 2, then the HARQ-ACK feedback for PDSCH1 may be scheduled for transmission during a PUCCH that is two slots after PDSCH1, the HARQ-ACK feedback for PDSCH2 may be scheduled for transmission during a PUCCH that is two slots after PDSCH2, etc.

In other scenarios, the DC may indicate a respective K1 value for each PDSCH transmission. In such scenarios, each K1 value may be treated as relative to the respective PDSCH. As one example, the DCI may explicitly include each of the N K1 values. As another example, the DC may include one or more index to a table that includes a plurality of entries (e.g., rows), wherein each entry indicates a plurality (e.g., N) of K1 values. E.g., if the DCI includes an index to a table entry indicating N K1 values, then those N K1 values may serve as respective K1 values for the N PDSCH transmissions in the multi-PDSCH transmission. The index may include less bits than would be needed to explicitly identify the N K1 values, leading to reduced signaling overhead. Such a table may be defined by RRC signaling, e.g., via a message such as dl-DataToUL-ACK_multi_PDSCH.

The PUCCH resource set may be selected based on size of the PUCCH, as well as other possible factors, such as priority, as discussed above.

In some scenarios, the DCI may include a single PRI value for use by all N PDSCH transmissions. If this results in a scheduling conflict between the respective HARQ-ACK feedback transmissions, then PRI may be incremented for one of the conflicting feedback transmissions, as discussed above.

In other scenarios, the DCI may indicate a respective PRI value for each PDSCH transmission. As one example, the DC may explicitly include each of the N PRI values. As another example, to reduce signaling overhead, the DC may include one or more index to a table that includes a plurality of entries, wherein each entry indicates a plurality (e.g., N) of PRI values, substantially as described above with regard to K1.

In some scenarios, the DCI may include HARQ priority information, e.g., by including a single HARQ priority value for use by all N PDSCH transmissions, or by indicating a respective HARQ priority value for each PDSCH transmission.

In another variation of the third approach, the DCI may indicate (e.g., expressly identify) a PRI value for PDSCH1, and PRI values for subsequent PDSCH transmissions may be determined using an offset value to identify an offset from the indicated PRI. For example, a table may be configured, e.g., by RRC signaling, which may contain a plurality of available offset values. In some scenarios, the DCI may include one or more index values, identifying respective entries in the table, representing offset values to apply for respective PDSCH transmissions.

As a specific example, a DC1 may indicate a grant for PDSCH1 with a PRI of PR110. The DCI may not expressly identify PRI values for the remaining PDSCH transmissions. However, the DCI may include index values that correspond to table entries indicating 2, −3, and 1, respectively. In response, the UE may recognize that HARQ-ACK feedback for PDSCH2 is scheduled for transmission according to PR112 (i.e., PR110+2), HARQ-ACK feedback for PDSCH3 is scheduled for transmission according to PRI9 (i.e., PR112-3), and HARQ-ACK feedback for PDSCH4 is scheduled for transmission according to PR110 (i.e., PRI9+1), In this example, the HARQ-ACK feedback for PDSCH4 may be scheduled for transmission in a different slot and/or according to a different PUCCH resource set than the feedback of PDSCH1, such that there is no scheduling conflict, despite the repeated PRI value.

Combined Repetition and Multi-PxSCH Scheduling

In multi-PxSCH scheduling, repetition may be enabled for one or more of the PxSCH transmissions. For example, all PxSCH transmissions may be repeated. As another example, only specific PxSCH transmissions may be repeated.

In some scenarios, additional signaling may be provided to indicate such repetition. For example, such signaling may indicate at least the number of repetitions for each PxSCH transmission, the type of repetition, and a HARQ process-to-PxSCH transmission occasion mapping indication.

The number of repetitions for each PxSCH transmission may be configured in RRC, e.g., for all PxSCH transmissions, or for each PxSCH. For example, a TDRA table configured by RRC signaling may include a respective indication of the number of repetitions for each PxSCH transmission. Alternatively, the DCI may include an indication of the number of repetitions for each PxSCH transmission.

The type of repetition may be specified according to any known repetition types. For example, for PUSCH transmissions, per-slot repetition may be semi-statically configured. Alternatively, Type A repetition (dynamic repetition per slot) or Type B repetition (dynamic mini-slot % cross-slot repetition) may be signaled for each PUSCH transmission or for the multi-PUSCH transmission. For PDSCH, FDM or TDM repetition may be signaled for each PDSCH transmission or for the multi-PDSCH transmission.

To map the HARQ process to PxSCH transmission occasions, the DAI may be incremented only for unique PxSCH transmissions, and not for retransmissions. For example, a multi-PDSCH transmission may include 4 PDSCH transmissions, in which one PDSCH transmission is a retransmission, as follows: (PDSCH1, PDSCH2, PDSCH2, PDSCH31. In this example, the cDAI may be incremented as [0, 1, x, 2]. I.e., the cDAI may not be incremented for retransmission of PDSCH2. The HARQ process number may similarly be incremented only for retransmissions.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets), The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   processor circuitry; and
   a memory element storing software instructions executable by the processor circuitry to cause a base station of a wireless communication network to:
   generate a single downlink control message including:
   respective downlink grants for a plurality of payload data messages; and
   parameters indicating uplink resources for transmission of acknowledgment feedback for each of the payload data messages;
   transmit the downlink control message to a user equipment (UE);
   transmit the plurality of payload data messages according to the downlink grants; and
   receive, from the UE, acknowledgment feedback for each of the payload data messages, via the indicated uplink resources;
   wherein the parameters specify a first uplink message for transmission of acknowledgment feedback for a first set of the plurality of payload data messages of a high priority and a second uplink message for transmission of acknowledgment feedback for a second set of the plurality of payload data messages of a low priority, and wherein the downlink control message identifies the first set of the payload data messages as high-priority messages and the second set of the payload data messages as low-priority messages.

2. The apparatus of claim 1, wherein the plurality of payload data messages is transmitted on a physical downlink shared channel (PDSCH).

3. The apparatus of claim 1, wherein the indicated uplink resources are selected based on the size of the acknowledgment feedback for all of the payload data messages of the plurality of payload data messages.

4. The apparatus of claim 1, wherein the downlink control message specifies a first modulation and coding scheme (MCS) for the first of the uplink messages, and a second MCS for the second of the uplink messages.

5. The apparatus of claim 1, wherein the indicated uplink resources specify a respective uplink message for transmission of the acknowledgment feedback for each of the payload data messages.

6. The apparatus of claim 5, wherein the downlink control message includes an indication of a number of slots, indicating that, for each of the payload data messages of the plurality of payload data messages, the uplink resources for transmission of acknowledgment feedback for the respective payload data message are located in the slot that follows transmission of the respective payload data message by the indicated number of slots.

7. The apparatus of claim 5, wherein the downlink control message includes a respective indication of a number of slots for each of the payload data messages of the plurality of payload data messages, wherein the uplink resources for transmission of acknowledgment feedback for a payload data message are located in the slot that follows transmission of the payload data message by the respective indicated number of slots.

8. The apparatus of claim 5, wherein the downlink control message includes an index identifying an entry in a predefined table, the entry identifying a plurality of timing indicators, wherein each of the timing indicators corresponds to a respective payload data message of the plurality of payload data messages, wherein each of the timing indicators indicates a time difference between the slot in which the corresponding payload data message is scheduled to be transmitted and a slot in which the corresponding acknowledgment feedback is scheduled to be transmitted.

9. A base station for communicating in a wireless communication network, the base station comprising:
   transceiver circuitry configured to transmit and receive wireless communication signals; and
   processing circuitry coupled to the transceiver circuitry, the processing circuitry configured to cause the base station to:
      generate a single downlink control message including:
         respective downlink grants for a plurality of payload data messages; and
         parameters indicating uplink resources for transmission of acknowledgment feedback for each of the payload data messages;
      transmit the downlink control message to a user equipment (UE);
      transmit the plurality of payload data messages according to the downlink grants; and
      receive, from the UE, acknowledgment feedback for each of the payload data messages, via the indicated uplink resources;
   wherein the parameters specify a first uplink message for transmission of acknowledgment feedback for a first set of the plurality of payload data messages of a high priority and a second uplink message for transmission of acknowledgment feedback for a second set of the plurality of payload data messages of a low priority, and wherein the downlink control message identifies the first set of the payload data messages as high-priority messages and the second set of the payload data messages as low-priority messages.

10. A apparatus comprising:
   processor circuitry; and
   a memory element storing software instructions executable by the processor circuitry to cause a user equipment (UE) of a wireless communication network to:
      receive, from a base station of the wireless communication network, a single downlink control message including respective downlink grants for a plurality of payload data messages;
      receive, from the base station, at least a subset of the plurality of payload data messages;
      determine uplink resources for use in transmitting feedback information for each of the payload data messages, wherein the determining is based on parameters included in the downlink control message; and
      transmit the feedback information for each of the payload data messages, via the determined uplink resources;
   wherein the parameters included in the downlink control message specify a first uplink message for transmission of acknowledgment feedback for a first set of the plurality of payload data messages of a high priority and a second uplink message for transmission of acknowledgment feedback for a second set of the plurality of payload data messages of a low priority, and wherein the downlink control message identifies the first set of the payload data messages as high-priority messages and the second set of the payload data messages as low- priority messages.

11. The apparatus of claim 10, wherein the downlink control message specifies a first modulation and coding scheme (MCS) for the first of the uplink messages, and a second MCS for the second of the uplink messages.

12. The apparatus of claim 10, wherein the parameters included in the downlink control message specify a respective uplink message for transmission of the feedback information for each of the payload data messages.

13. The apparatus of claim 12, wherein the downlink control message includes an index identifying an entry in a predefined table, the entry identifying a plurality of timing indicators, wherein each of the timing indicators corresponds to a respective payload data message of the plurality of payload data messages, wherein each of the timing indicators indicates a time difference between the slot in which the corresponding payload data message is scheduled to be transmitted and a slot in which the corresponding feedback information is scheduled to be transmitted.

* * * * *